(12) United States Patent
Burris et al.

(10) Patent No.: US 11,720,528 B2
(45) Date of Patent: Aug. 8, 2023

(54) COLLECTIONS FOR STORAGE ARTIFACTS OF A TREE STRUCTURED REPOSITORY ESTABLISHED VIA ARTIFACT METADATA

(71) Applicant: INTERNATIONAL BUSINESS MACHINES CORPORATION, Armonk, NY (US)

(72) Inventors: Thomas J. Burris, Newton, MA (US); Bhavan Kumar Kasivajjula, Surfers Paradise (AU); Manish Kataria, New Delhi (IN); Anurag Srivastava, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/567,758

(22) Filed: Jan. 3, 2022

(65) Prior Publication Data
US 2022/0121622 A1    Apr. 21, 2022

Related U.S. Application Data

(60) Division of application No. 16/579,365, filed on Sep. 23, 2019, now Pat. No. 11,226,932, which is a
(Continued)

(51) Int. Cl.
*G06F 16/16* (2019.01)
*G06F 16/245* (2019.01)
(Continued)

(52) U.S. Cl.
CPC .......... *G06F 16/164* (2019.01); *G06F 16/156* (2019.01); *G06F 16/168* (2019.01);
(Continued)

(58) Field of Classification Search
CPC .... G06F 16/164; G06F 16/156; G06F 16/168; G06F 16/245; G06F 16/903; G06F 16/256
See application file for complete search history.

(56) References Cited

U.S. PATENT DOCUMENTS

| | | | |
|---|---|---|---|
| 6,438,564 B1 | 8/2002 | Morton | |
| 7,383,302 B2 | 6/2008 | Cohen | |

(Continued)

OTHER PUBLICATIONS

U.S. Appl. No. 12/826,335, Non-Final Office Action, dated Mar. 28, 2012, 15 pg.
(Continued)

*Primary Examiner* — Dangelino N Gortayo
(74) *Attorney, Agent, or Firm* — Cuenot, Forsythe & Kim, LLC

(57) ABSTRACT

At least one unique collection of storage artifacts can be specified to indicate that the storage artifact is a member of the unique collection. Each storage artifact can be a discrete object comprising digitally encoded content that is stored as a node within a tree structure of a tangible storage medium. The collection can be referenced by a set of different storage artifacts to form a collection of related storage artifacts. Each storage artifact can correspond to different collections, wherein membership within a collection is independent of a storage path within the tree structure. A file management action relating to the storage artifact can be performed. The file management action can be dependent upon the storage artifact being a member of the unique collection.

18 Claims, 4 Drawing Sheets

Related U.S. Application Data continuation of application No. 12/826,335, filed on Jun. 29, 2010, now Pat. No. 10,423,577.

(51) Int. Cl.
*G06F 16/903* (2019.01)
*G06F 16/14* (2019.01)
*G06F 16/28* (2019.01)
*G06F 16/954* (2019.01)
*G06F 16/248* (2019.01)
*G06F 16/25* (2019.01)

(52) U.S. Cl.
CPC .......... *G06F 16/245* (2019.01); *G06F 16/903* (2019.01); *G06F 16/248* (2019.01); *G06F 16/256* (2019.01); *G06F 16/289* (2019.01); *G06F 16/954* (2019.01)

(56) References Cited

U.S. PATENT DOCUMENTS

| | | | |
|---|---|---|---|
| 7,398,261 | B2 | 7/2008 | Spivack |
| 7,672,950 | B2 | 3/2010 | Eckardt, III |
| 7,672,961 | B2 | 3/2010 | Barton |
| 7,680,777 | B2 | 3/2010 | Poston |
| 7,707,197 | B2 | 4/2010 | Kaasten |
| 7,747,625 | B2 | 6/2010 | Gargi |
| 7,792,868 | B2 | 9/2010 | Finkelstein |
| 7,840,619 | B2 | 11/2010 | Horn |
| 7,930,288 | B2 | 4/2011 | Delgado |
| 7,975,239 | B2 | 7/2011 | Bellotti |
| 8,001,013 | B2 | 8/2011 | Serbanescu |
| 8,024,340 | B2 | 9/2011 | Kageyama |
| 8,140,584 | B2 | 3/2012 | Guha |
| 8,275,765 | B2 | 9/2012 | Li |
| 8,412,698 | B1* | 4/2013 | Sarukkai ............. G06F 16/9535 707/706 |
| 8,554,827 | B2 | 10/2013 | Walsh |
| 9,348,842 | B2 | 5/2016 | Wu |
| 10,423,577 | B2 | 9/2019 | Burris et al. |
| 11,226,932 | B2 | 1/2022 | Burris et al. |
| 2004/0015514 | A1 | 1/2004 | Melton |
| 2004/0153479 | A1 | 8/2004 | Mikesell |
| 2005/0015377 | A1 | 1/2005 | Wan |
| 2005/0138631 | A1 | 6/2005 | Bellotti |
| 2005/0188016 | A1 | 8/2005 | Vdaygiri |
| 2005/0246324 | A1* | 11/2005 | Paalasmaa ............. G06F 16/951 |
| 2007/0005576 | A1* | 1/2007 | Cutrell ............. G06F 16/90324 707/E17.14 |
| 2007/0112744 | A1* | 5/2007 | Arrouye ................. G06F 16/168 |
| 2007/0112900 | A1* | 5/2007 | Arrouye ................. G06F 16/168 |
| 2007/0124375 | A1 | 5/2007 | Vasudevan |
| 2008/0077571 | A1 | 3/2008 | Harris |
| 2008/0195651 | A1 | 8/2008 | Rachmiel |
| 2008/0270462 | A1 | 10/2008 | Thomsen |
| 2009/0006468 | A1 | 1/2009 | Shankar |
| 2009/0013044 | A1 | 1/2009 | Stull |
| 2009/0150431 | A1 | 6/2009 | Schmidt |
| 2009/0204882 | A1 | 8/2009 | Hollander |
| 2009/0217352 | A1* | 8/2009 | Shen ....................... G06F 16/48 707/999.1 |
| 2010/0083173 | A1 | 4/2010 | Germann |
| 2010/0138420 | A1 | 6/2010 | Bator |
| 2011/0320479 | A1 | 12/2011 | Burris et al. |
| 2020/0019534 | A1 | 1/2020 | Burris et al. |

OTHER PUBLICATIONS

U.S. Appl. No. 12/826,335, Non-Final Office Action, dated Jul. 5, 2012, 18 pg.

U.S. Appl. No. 12/826,335, Non-Final Office Action, dated Nov. 26, 2012, 34 pg.

U.S. Appl. No. 12/826,335, Final Office Action, dated Mar. 28, 2013, 31 pg.

U.S. Appl. No. 12/826,335, Examiner's Answer, dated Aug. 28, 2014, 25 pg.

U.S. Appl. No. 12/826,335, Patent Board Decision, dated Jun. 29, 2016, 24 pg.

U.S. Appl. No. 12/826,335, Non-Final Office Action, dated Nov. 29, 2016, 20 pg.

U.S. Appl. No. 12/826,335, Final Office Action, dated May 10, 2017, 22 pg.

U.S. Appl. No. 12/826,335, Examiner's Answer, dated Dec. 22, 2017, 9 pg.

U.S. Appl. No. 12/826,335, Patent Board Decision, dated Apr. 15, 2019, 7 pg.

U.S. Appl. No. 12/826,335, Notice of Allowance, dated May 15, 2019, 7 pg.

U.S. Appl. No. 16/579,365, Restriction Requirement, dated Apr. 19, 2021, 5 pg.

U.S. Appl. No. 16/579,365, Non-Final Office Action, dated Jun. 15, 2021, 8 pg.

U.S. Appl. No. 16/579,365, Notice of Allowance, dated Nov. 10, 2021, 9 pg.

U.S. Appl. No. 16/579,365, Notice of Allowance, dated Nov. 19, 2021, 6 pg.

Hsieh, A collaborative desktop tagging system for group knowledge management based on concept space, [online] ACM Portal, Expert Systems with Applications: An International Journal, vol. 36, No. 5., pp. 9513-9523, Jul. 2009 [retrieved Jun. 29, 2010] retrieved from the Internet: <http://portal.acm.orgicitation.cfm?id=1513115>.

Hunter, J., et al., "A System for Tagging Relationships Between Multiple Mixed-Media Objects," [online] IEEE Computer Society, IEEE Xplore, Jul.-Sep. 2008, vol. 15, No. 3, pp. 42-53, [retrieved Mar. 17, 2010] retrieved from the Internet: <http://www.computer.org/portal/webicsdlidoi/10.1109/MMUL.2008.75>.

Locoro, A., et al., "Semantic Annotation and Tagging in the KP-LAB environment: Mining the learning and knowledge dynamics," [online] Research, Reflections and Innovations in Integrating ICT in Education, pp. 572-576, [retrieved Jun. 29, 2010] retrieved from the Internet: <http://www.formatex.org/micte2009/book/572-576.pdf>.

* cited by examiner

COLLECTIONS FOR STORAGE ARTIFACTS OF A TREE STRUCTURED REPOSITORY ESTABLISHED VIA ARTIFACT METADATA

BACKGROUND

The present invention relates to the field of storage artifacts and, more particularly, to collections for storage artifacts of a tree structured repository established via artifact metadata.

Currently, no effective way exists for users to relate files in a tree structured data store to each other irrespective of the location, type of the artifact, or application. That is, often users want to relate a set of heterogeneous files to each other for a specific purpose. The users can want this set of files to be independent of any specific application (i.e., independent of an office suite, a document management solution, etc.). For example, a user may utilize a word processing program to write a document for a specific activity, may use a spreadsheet program for numerical analysis for the same activity, may use a presentation program for discussion on the activity, and may use an email program to solicit feedback from others. Each of these programs utilizes different types of files.

To resolve this challenge, a user may attempt to store all of these files within a single folder, which can be problematic when multiple users collaborate on the same activity. That is, it is easy for the various files to become out of date, for users to forget to update the folder, and for other manual organizational problems to arise. Some of these problems can be situationally resolved using a corporate document management system. Other times, however, a set of coordinating users will lack suitable permissions to access the same corporate management system, so file sharing and maintenance is still challenging. Document management systems and their constraints can even aggravate document maintenance problems on occasion, especially when multiple different entities are collaborating, which use different document management systems. Different entities can even use different and incompatible operating systems, computing platforms, and file management systems. Thus, database systems that centrally maintain necessary correspondences between files are prone to problems and shortcomings by their very nature, due to platform, operating system, and/or application incompatibilities.

Another problem with existing file management systems is that a single file can be related to more than one context, grouping, or activity. A strict hierarchy of nodes used by most tree structured repositories cannot accommodate these multiple different groupings. A work around that is often used to overcome this limitation is the use of shortcuts, which are files that reference other files. Placeholders can be placed in a hierarchy structure at a desired place, which is different from the location of the referenced file. This structure is prone to corruption and can be difficult to maintain. That is, it is common for shortcuts to have "broken links" to the files to which they point. Processing overhead to track all links to specific files, which can be moved and otherwise manipulated without the links automatically being updated in most cases, can be significant.

BRIEF SUMMARY

One aspect of the disclosure can include a method, computer program product, system, and apparatus for establishing collections of storage artifacts (e.g., files). At least one unique collection of storage artifacts can be specified within metadata. Each storage artifact can be a discrete object comprising digitally encoded content that is stored as a node within a tree structure of a tangible storage medium. The collection can be referenced by a set of different storage artifacts to form a collection of related storage artifacts. Each storage artifact can correspond to different collections, wherein membership within a collection is independent of a storage path within the tree structure. A file management action relating to the storage artifact can be performed. The file management action can be dependent upon the storage artifact being a member of the unique collection.

One aspect of the disclosure can include a system with a tangible data store and a storage artifact engine. The tangible data store can include a set of storage artifacts. Each of the storage artifacts can be a discrete object comprising digitally encoded content that is stored as a node within a tree structure. The storage artifacts can be related to a set of different collections, where each collection is able to be referenced by a set of different storage artifacts. Each of the different storage artifacts can correspond to a set of different collections. Membership in a collection can be independent of a storage path within the tree structure of each of the storage artifacts. The storage artifact engine can perform a set of file management actions against the storage artifacts. The file management actions can include an add action to add a storage artifact to a collection, a remove action to remove a storage artifact from a collection, and an edit action to modify specifics of an existing collection.

One aspect of the disclosure can include a computing desktop rendered by a processor executing computer readable instructions to cause a display (e.g., computer monitor) to present interactive graphical objects within a graphical user interface. The desktop can include a set of icons presented within a graphical user interface of a computing desktop. Each icon can represent a storage artifact of a tree structured repository. The repository can include a tangible storage medium within which a set of storage artifacts are digitally encoded. The storage artifacts include a set of storage artifacts corresponding to each of the icons. The desktop can also include a pop-up window that is selectively presented upon having selected any of the icons. The pop-up window can include at least one collection option. The collection option(s) can include a set of file management actions pertaining to a collection, which are able to be selectively initiated for the storage artifacts represented by the icons. The file management actions can change a membership state of one or more of the storage artifacts within one or more collections.

DETAILED DESCRIPTION

Figure 1:
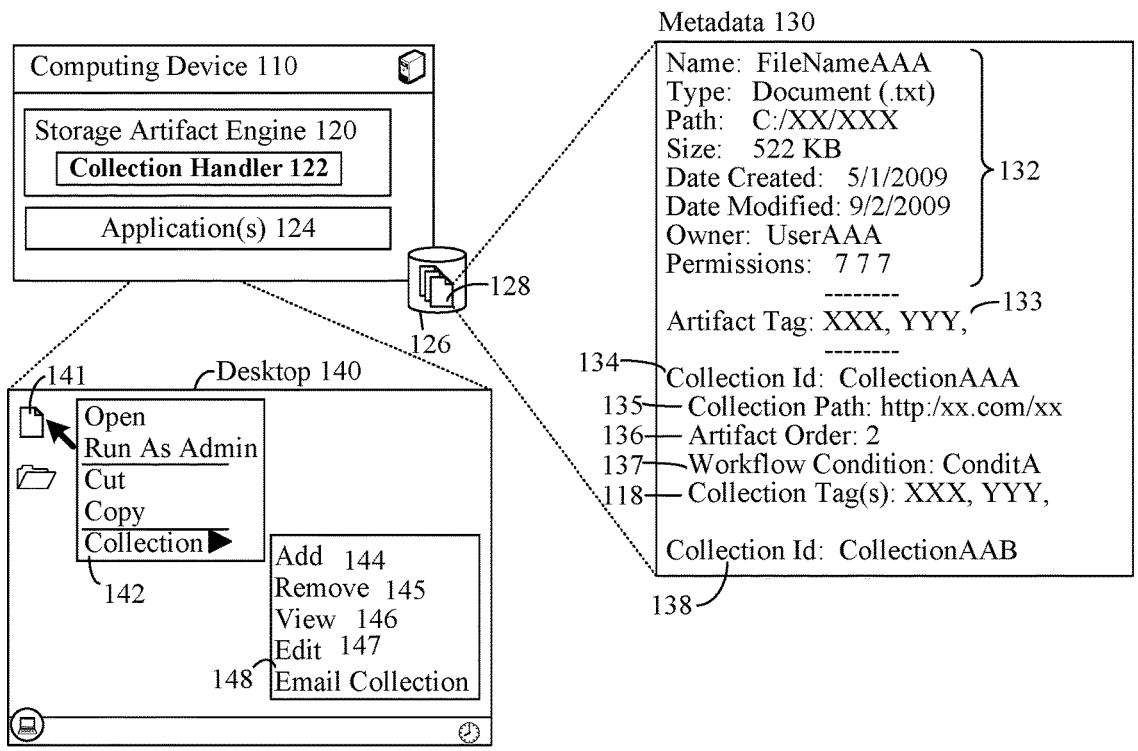
FIG. 1 is a schematic diagram of a system for establishing collections of storage artifacts using metadata of the storage artifacts to specify membership with the collection in accordance with an embodiment of the disclosure.
Figure 1:
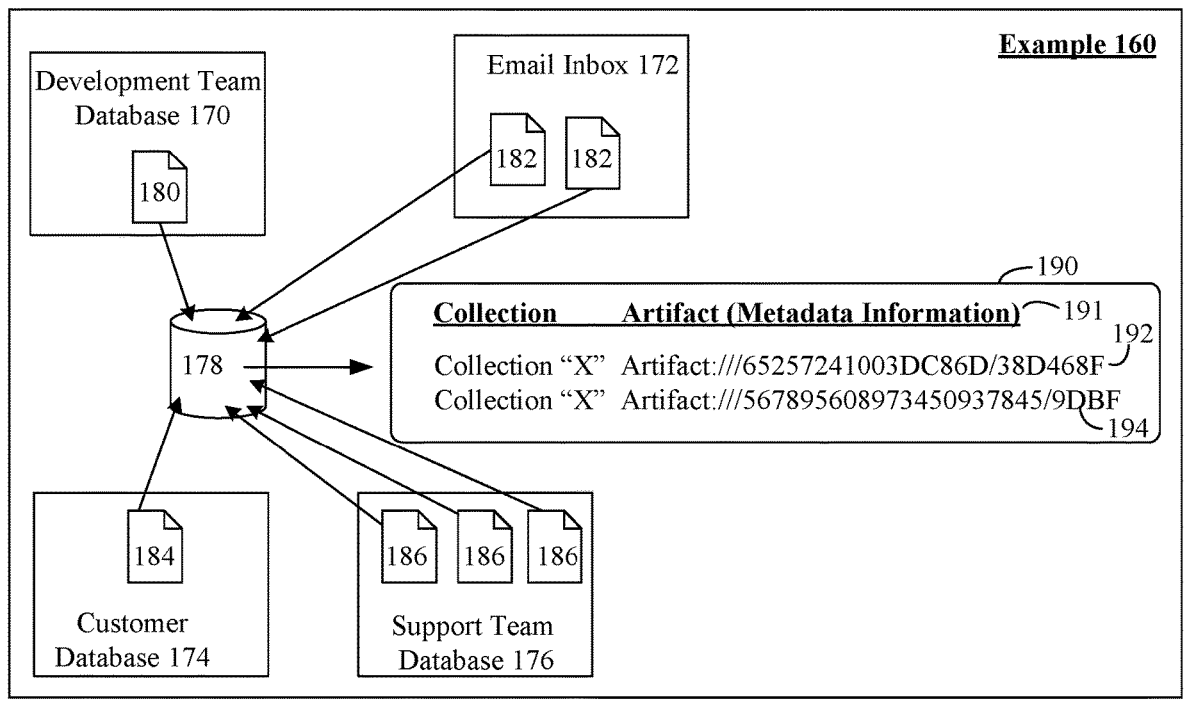

In the disclosure, a collection indicator can be added to metadata of a file or other discrete storage artifact of a tree structured repository. More than one collection indicator can be used to represent that the file is a member of multiple different collections. Since the collection reference is associated with the file itself, it is copied as the file is copied, updated as the file is updated, and is generally non-interfering with existing file management systems regardless of their implementation specifics. These file management systems can, however, be enhanced to utilize the metadata when performing file management actions. For example, in one embodiment collections can be copied, deleted, moved, and the like. Moreover, when a file is selected and a file management action is performed against that file, a user can optionally have that same action performed against every file involved in an associated collection. Search actions can be conducted across collections, where collections are used as search criteria or filters. It should be appreciated that collections can be implemented irrespective of a physical location (storage path within a tree structured repository) of any of the member files.

Further, collection specific annotations, tags, and keywords can be established, which can be used for searching and information finding purposes. In one embodiment, each the various files of a collection can be ordered relative to each other. Additionally, they can be organized into a workflow. Use of collections, which are defined using metadata of the associated files, can minimize complexities involved with searching, file back-up, file deletions, file moving, and the like. In one embodiment, the solution works across a distributed computing space and can work in a platform independent manner. For example, the solution works equally well for local storage repositories, for network based repositories, for cloud-based repositories of files, and so forth.

In one embodiment, a collection (including the metadata associations within files forming the collection) can represent a single, logical composite object that can be searched, shared, and be used to create and define workflows. In one embodiment, composite objects (collections) can be specific to a single individual or group of individuals. Thus, a composite object (e.g., collection) can be individually authored. A composite object can be static in the sense that it has been created by a user and it can encapsulate his/her knowledge with respect to the individual storage artifacts (e.g., files) in the set and/or to the overall collection of artifacts (with the intent of enabling re-use and sharing).

Collections (and composite objects) can be used in a myriad of manners. For instance, collections permit the treatment of a set of storage artifacts as a single logical grouping (a composite object). That is, collections can permit originality of individual storage artifacts to be retained. Thus, the storage artifacts can be left intact to be used in their individual capacity (as opposed to significantly transforming the storage artifacts during the creation of the composite object). Additionally, a composite object remains "current", as it is automatically changed/updated whenever member storage artifacts are updated. Access control to parts of a composite object is automatic, since permission levels associated with the member storage artifacts are unchanged by their membership within the collection.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 is a schematic diagram of a system 100 for establishing collections of storage artifacts 128 using metadata of the storage artifacts 128 to specify membership with the collection in accordance with an embodiment of the disclosure. The collections can permit relationships among storage artifacts 126 to be persisted using metadata 130 as a relationship specifying construct.

One alternative way to refer to a specific collection, is to use the term composite object. A composite object being a set of storage artifacts 128 (the set including those artifacts that are members of the collection). In one embodiment, the composite object can be manipulated by file management tools and applications 124 in a manner analogous to how an individual storage artifact 128 is handled. Even though a composite object is created, originality is retained for the constituent storage artifacts 128, which have been left intact to be used in their individual capacity. That is, creation of a composite object does not transform the storage artifacts 128 or change a manner in which existing tool manipulate storage artifacts 128. It instead provides a new means or extension to defining, sharing, searching, and otherwise manipulating storage artifacts 128 as a collection (or as a composite object). A single storage artifact 128 can belong to any number (0 . . . N) of collections. Further, a collection can include any number (0 . . . N) of storage artifacts.

System 100 shows a computing device 110 with a storage artifact engine 120 for performing operations on storage artifacts 128. The operations can include a set of collection related operations, which are performed by the collection handler 122. The collection handler 122 can use metadata 130 of the storage artifacts 128 to specify which set of collections (134, 138), if any, a storage artifact 128 belongs.

Operations (e.g., file management actions) performed by the collection handler 122 can include, but are not limited to, an add 144 operation, a remove 145 operation, a view 146 operation, an edit 147 operation, a communication 148 operation, and the like. The operations of the collection handler can be triggered by a user in a variety of ways depending on implementation choices. For example, options (e.g., toolbar items, menu items, hot-key commands, etc.) can be added to a user interface various applications 124 to permit a user to trigger any of the collection related operations from within the applications 124 themselves. The operations can also be integrated into an operating system of the device 110 and/or into a file management modules used by device 110.

Thus, in one embodiment, collection related operations can be implemented independent of any specific application 124. Further, the metadata 130 for establishing the collections can be specified in accordance with standards, to which a plurality of different operating systems, file manager modules, and/or applications 124 conform. Hence, the use of collections as disclosed can be implemented across different hardware and software platforms.

This versatility is expressed in example 160. This example is to be contrasted with conventional storage systems, where heterogeneous storage artifacts are stored within different databases and/or file systems. For example, one set of files may be managed within a customer database/file system and a separate set of files may be managed by a development team database/file system. A need to establish relationships among files within both databases/file systems can exist, yet a set of end users (who lack permissions for directly accessing both distinct databases) would have no ability to establish these relationships.

Unlike conventional storage systems, system 100 as shown by example 160 provides end users with an ability to explicitly associate heterogeneous storage artifacts 180-186 into a collection 178 of related objects. The collection 178 is not a physical storage location of any of the storage artifacts 180-186. Indeed the storage artifacts 180-186 can be stored in a number of different file structures/database structures, such as development team database 170, email inbox 172, customer database 174, and support team database 176. A format, storage conventions, and other specifics for storing the artifacts 180-186 is irrelevant, and metadata (e.g., 130) of any of the files 180-186 can be used to establish membership in the collection 178. Additionally or alternatively, information about membership of a storage artifact within a collection can be maintained within a collection log 190.

For instance, the collection, as shown by log 190 can indicate a collection name, artifact name, and other metadata 191. For each storage artifact, a record 192, 194 can be established that shows member artifacts 180-186 and their location. The metadata 191 of the log 190 can include artifact 180-186 level information and/or collection-level information.

Turning back to the add 144 operation, it can permits a user to specify a collection, which a storage artifact 141 is to become a member of. When the add 144 operation is performed, a collection ID 134 for the new collection can be added to metadata 130 of the associated storage artifact 128. Additionally or alternatively, a collection-level record (178) can be established that references the storage artifact 128 responsive to the add 144. In other words, a one-way or two way (for faster indexing) can occur from artifact to collection and/or from collection to artifact depending on implementation choices.

In one embodiment, a collection icon (which can be an icon for a composite object, using a different idiom) or identifier presented within a GUI (desktop 140 for example), which storage artifacts 128 can be dropped and dragged onto to trigger the add 144 operation. In one embodiment, options can be presented within the applications 124 in a document view for relating the document (or other storage artifact) to a user specified collection. In one embodiment, when adding (144) a storage artifact to a collection, a collection database can be referenced and auto-populated so that a listing of collections most likely (determined by user permissions and/or a prediction algorithm) to be related to a storage artifact can be determined and presented within a user interface. In one embodiment a hierarchy can be established and a user can navigate to an existing database ("e.g., artifact/document/database") that the current storage artifact 128 is to be linked to. In one embodiment, a user can enter text (into metadata 130 or another interface) that references (either absolute or using relative addressing) a collection to which the storage artifact 128 is to be linked. In one embodiment, the linkages to a collection can occur by first showing a collection and collection specifics, then by having a storage artifact be added to that collection—by selecting a storage artifact while a collection has focus.

The remove 145 operation can sever a linkage between a storage artifact 128 and a collection, which removes the storage artifact 128 from the collection. The results of the remove 145 operation can update metadata 130 of the storage artifact so that it no longer references the collection 134. Additionally or alternatively, a collection-level record (log 190) can be removed.

The view 146 operation can permit a user to see specifics of the collection and/or specifics of the storage artifact. For example, the tags, keywords, 133 and other properties specified within the metadata 130 can be viewed, as can collection 118, 134-138 specific data. As an aside, this type of data 118, 133-138, can be indexed and used for searching.

The edit 147 operation can permit a user to change values of any of the artifact 132, 133 and/or collection 118, 134-138 specific data. For example, artifacts tags, keywords, comments 133 and collection tags, keywords, comments 118 can be edited, as can artifact order 136, workflow conditions 137, and the like.

One or more communication 148 operation can be used for triggering an operation that works across all storage artifacts of a collection. For example, selecting a single document 141, a user can opt to have all storage artifacts 128 of the collection emailed via a communication 148 operation. Communication 148 operations can relate to instant messaging, data synchronization, file storage, Web based collaboration, cloud storage, and the like. The operations 144-148 are not intended to be comprehensive (for example, searching based on collection information is contemplated), but are to illustrate some of the collection-based operations able to be implemented.

It should be emphasized that membership within the collections can be independent of a storage path used by the storage artifacts 128. For example, storage artifacts 128 belonging to a collection can be stored across any set (1 . . . N) of data stores 126. Each storage artifact 128 can belong to 0 . . . N collections. Each collection can include any number (0 . . . N) of storage artifacts 128. The variable N refers to an integer.

As used herein, each storage artifacts 128 can be a discrete object that is digitally encoded within data store 126, which can be a tangible, non-transient storage medium (e.g., data store 128). For example, each storage artifact 128 can be a file contained in a hard drive or other type of non-volatile or persistent memory. The files (storage artifacts 128) can be heterogeneous ones. The storage artifacts 128 can be associated with a set of one or more applications 124. Each storage artifact 128 can be stored as a node within a tree structure. In one embodiment, the tree structure can be a rooted hierarchy tree structure, such as a hierarchical file system. The tree structure can also be a disk file system for the storage of files (e.g., storage artifacts 128).

Disk file systems compatible with the disclosure can include, but are not limited to, File Allocation Table (FAT) (e.g., FAT12, FAT16, FAT32, exFAT), New Technology File System (NTFS), Hierarchical File System (HFS), HFS Plus (HFS+), HPFS (High Performance File System), Unix file system (UFS), second extended file system (ext2), third extended file system (ext3), fourth extended file system (ext4), B-tree file system (btrfs), Compact Disc File System (CDFS or ISO 9660), on-disk structure (ODS-5 or Files-11), Veritas File System (VxFS or JFS and OnlineJFS, ZFS and Universal Disk Format (UDF), and the like. The disclosure is also compatible with journaling file systems and versioning file systems. As used herein, a journaling file system is a file system that keeps track of the changes it intends to make in a journal (such as a circular log in a dedicated area of the file system) before committing them to the main file system. A versioning file system can be a computer file system which allows a computer file to exist in several versions at the same time.

In one embodiment, storage artifacts 128 can be objects stored within a database structure. For example, RDBMS objects can be storage artifacts in one arrangement of the disclosure.

Metadata 130 can be data about a storage artifact 128 other than the content of the storage artifact, where the content is the content utilized by the application 124 when the storage artifact 128 is active. The metadata 130 is additional data for annotating the storage artifact/collection, for searching for the storage artifact/collection, for determining which collections storage artifacts 128 belong, and the like. Thus, the metadata 130 can be used to describe a definition, structure, administration, and the like of the storage artifacts/collections. Metadata 130 can be stored and managed within a database, often called a registry or repository and/or within a special location of a storage artifact. For example, when a storage artifact is an XML document, special types of tags (meta tags) can be utilized for different metadata 130 elements and their values.

Data store 126 (and 178) can be implemented as a physical or virtual storage space configured to store digital information. Each data store can, for example, be a tangible or non-transient storage medium. The data stores can be physically implemented within any type of hardware including, but not limited to, a magnetic disk, an optical disk, a semiconductor memory, a digitally encoded plastic memory, a holographic memory, or any other recording medium. Each data store can be a stand-alone storage unit as well as a storage unit formed from a plurality of physical devices. Additionally, information can be stored within data store in a variety of manners. For example, information can be stored within a database structure or can be stored within one or more files of a file storage system, where each file may or may not be indexed for information searching purposes. Further, each data store can utilize one or more encryption mechanisms to protect stored information from unauthorized access.

A computing device 110 can be capable of accessing and/or utilizing one or more storage artifact 126. A computing device 110 can include hardware (e.g., a processor, non-volatile memory, volatile memory, network transceiver, communication bus, and the like) and computer program products (e.g., software/firmware able to be executed by the hardware). The computing device 110 can include, but is not limited to, a personal computer, a mobile phone, a Web tablet, a kiosk, a media player, a navigation device, an electronic gaming system, and the like. In various embodiments, a set of one or more computing devices 110 can be combined to for one functional unit, and a single computing device 110 can be divided (using virtualization technologies) into multiple different functional units.

In system 100, computing devices and/or data stores can be communicatively linked to each other via a network. The network can include any hardware/software/and firmware necessary to convey digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Figure 2:
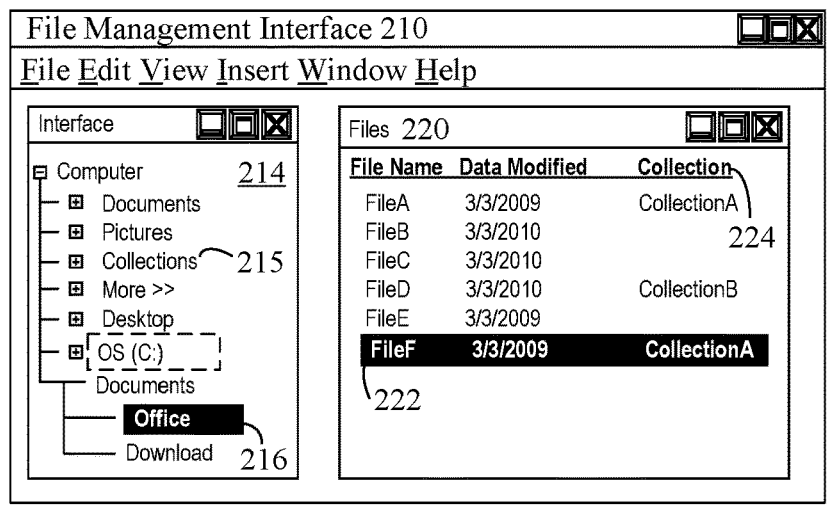
FIG. 2 shows sample user interfaces for storage artifacts grouped within collections in accordance with an embodiment of the disclosure.
Figure 2:
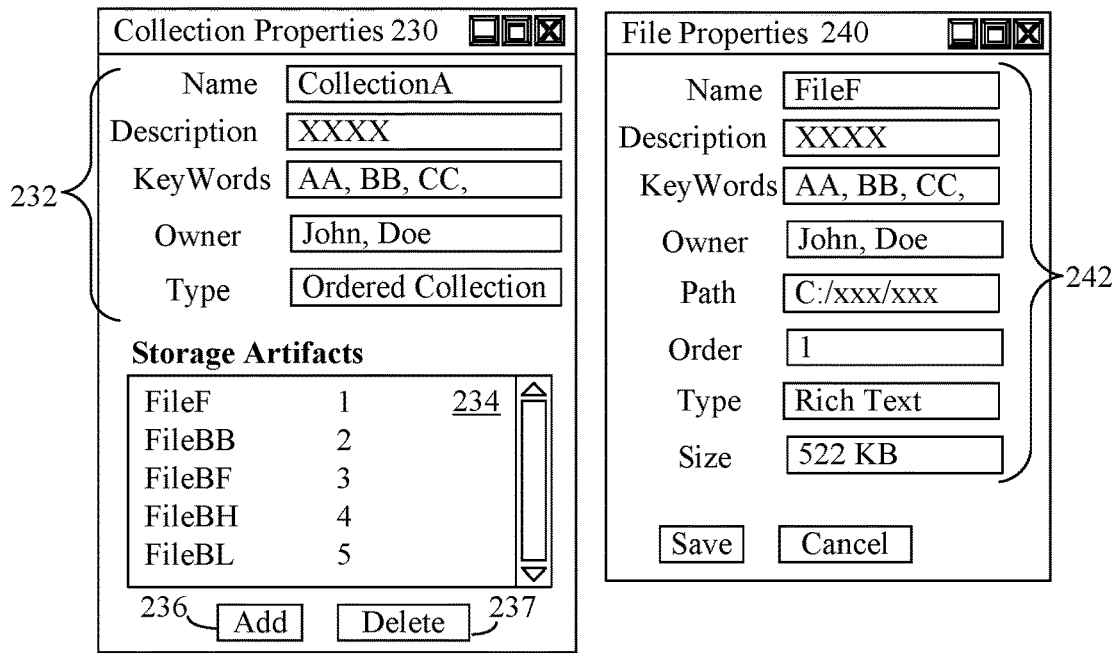
Figure 2:
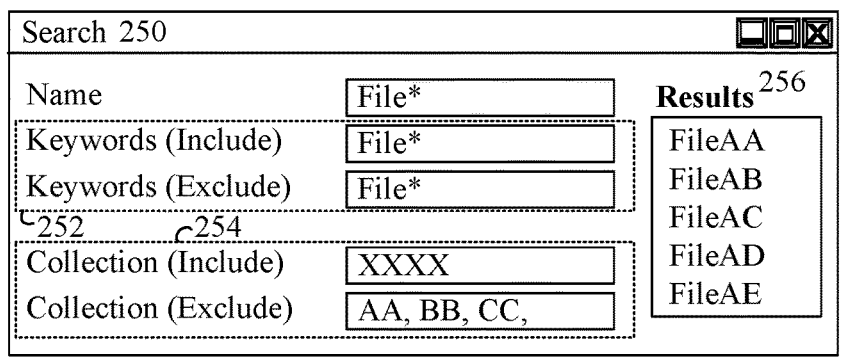

FIG. 2 shows sample user interfaces for storage artifacts grouped within collections in accordance with an embodiment of the disclosure. The user interfaces of FIG. 2 include a file management interface 210, a collection properties interface 230, a file properties interface 240, and a search interface 250, which can be utilized with system 100 or a similar system. These interfaces 210, 230, 240, 250 are for illustrative purposes only and derivatives and alternatives are contemplated.

The file management interface 210 shows a file hierarchy section 214 in which a set of files are shown. The hierarchy section 214 is organized by file storage location. For example, a set of files can be organized by drive, drive partition, and folder, which is a hierarchy of nodes. When one node 216 (or folder) is selected in section 214, the files contained within that node 216 can be displayed in the file detail section 220. For example, section 220 can show FileA-FileF, which are both contained within the storage path "C:/Documents/Office/". The files of section 220 can be specific instances of storage artifacts 128. The organization shown (hierarchy) in section 214 and by the interface 210 can be an example of a tree structured repository. One of the shown properties for each file can be a collection, such as Collection A, or Collection B, which the related file can be a member of.

A file can be selected from within section 220, such as selecting FileF 222, along with a properties option (e.g., in one embodiment, a context window can be presented in interface 210 when a file is right-clicked, which has a property option). When the properties option is selected, a pop-up window, such as window 240 can be responsively presented. Properties window 240 can show metadata 242 (e.g., metadata 130) related to the selected file 222. The metadata 242 can include name, description, keyword, owner, pathway, type, size, and the like. Further, collection specific metadata elements 242, such as collection order, collection name, and the like, can also be shown in window 240. The values of the elements 242 can be edited and saved in one embodiment of the disclosure via window 240.

In one embodiment, the file management interface 210 can show composite objects (or collections) 215. These composite objects 215 can be shown, for example, under a specific heading, which is specific to a user. Thus, each user can have his/her own set of defined collections 215. Each collection 215 can encapsulate that user's knowledge (included in metadata 130 and within log 190, for example) with respect to the set of storage artifacts as a whole, or as individual units. The user can manipulate the composite objects (e.g., collections 215) in a manner similar to other objects, such as folders and files. That is, a user can copy, search, and/or delete, a collection 215. Further, a user can select a collection 215 (or composite object), which results in member storage objects being shown (in section 220, for example). Further, selection of a collection 215 can enable collection specific options, such as establishing workflow for the collection. Member storage artifacts in each collection 215 can be stored in any location and can be members of any number of other collections 215.

A different user selectable option from the file management interface 210 can cause the collection properties window 230 to be presented. Window 230 can show collection specific elements 232, which are optionally stored as metadata (e.g., from log 190 or 130, in one embodiment). Collection specific elements 232 can include a collection name, description, keywords, owner, type, and the like. Further, a section 234 of the window 230 can include a set of files that belong to the collection (e.g., CollectionA). For each file a storage path and order within the collection can be shown. It should be appreciated (from the paths) that the files in a collection can be independent of or unrelated to a storage path of that file. A user can opt to add 236 additional files to the collection, to dissociate files from the collection (delete 237), and the like.

In one embodiment, the different types of collections can include an unordered collection, a sequentially ordered collection, and a workflow collection. A workflow type of collection can have preconditions and post conditions established for related storage artifacts. Further, some of the storage artifacts of a workflow can be produced concurrently (in parallel) while others must be created/edited in series.

The file management interface 210 can also include an interface option for searching which can bring up a popup window 250 or its equivalent. Search window 250 permits a user to specify any of a variety of file attributes to search for a file matching these attributes. Attributes can include values of metadata specific to the files (e.g., 252). White lists (include artifacts matching the criteria) and black lists (exclude artifacts matching the criteria) based on metadata elements specific to files (e.g., storage artifacts) can be used for a search. As shown, keywords are used for inclusion/exclusion, but any properties (metadata recorded elements) can be used.

Further, collection specific elements/values 254 can be specified for a file search. These collection elements/values 254 can also be used for inclusion/exclusion purposes. As shown, collections matching a specified pattern can be included, while other collections matching different patterns can be excluded. Any type of collection specific element or value can be used for inclusion/exclusion purposes while searching. Further, collection and/or file specific values can be specified for filtering and/or prioritizing results 256.

Results section 256 can show a set of files matching the criteria and conditions. The files in the results section 256 need not be tied to any particular drive or storage location.

Figure 3:
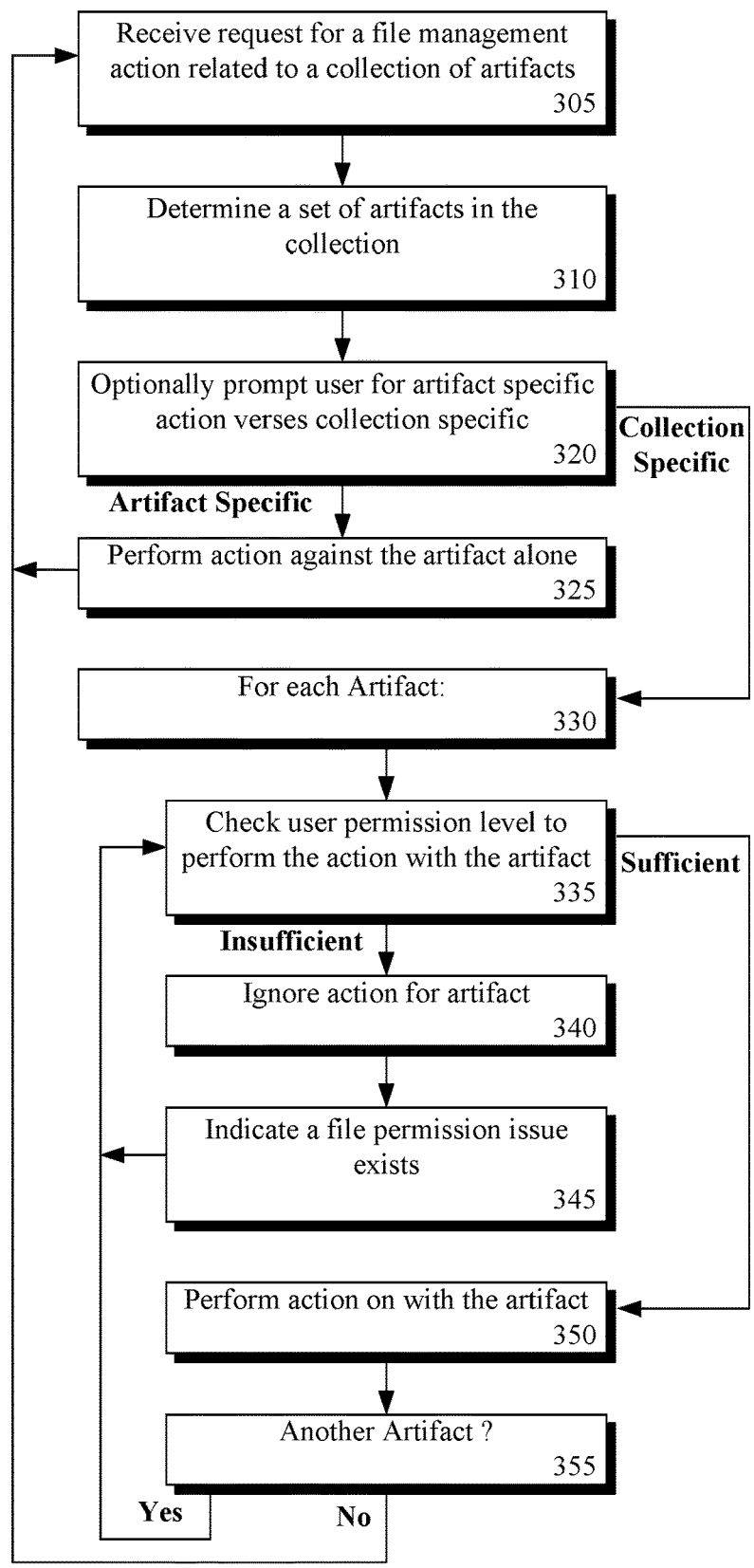
FIG. 3 shows a method for performing file management action(s) on storage artifacts in accordance with an embodiment of the disclosure.

FIG. 3 shows a method 300 for performing file management action(s) on storage artifacts in accordance with an embodiment of the disclosure. The method 300 can be performed in context of system 100.

In method 300, a request can be received for a file management action. The file management action can be related to a collection of artifacts. As such, the file management actions can be actions to add/remove a storage artifact to a collection, to add/remove a collection to a storage artifact, to view metadata elements related to a storage artifact/collection, to view metadata elements related to a storage artifact/collection, to search for a storage artifact/collection based upon storage artifact/collection metadata based criteria, to perform a communication action involving a storage artifact/collection, and the like.

In step 310, a set of storage artifacts in a collection related to the file management request can be determined. In step 315, a user can be optionally prompted to indicate whether the file management action is specific to one storage artifact or to an entire collection. When the action is artifact specific, the action can be performed against the artifact alone, as shown by step 325. After step 325 further computing actions (including additional file management actions) can occur.

When the action is for a collection, the method can proceed from step 320 to step 330, which causes execution of a set of steps 335-355, which repeat for each artifact in the collection. In step 335, a check for sufficient permission levels for the user to perform the action related to the artifact can be performed. If insufficient, the action can be ignored for the artifact, as shown by step 340. Further, an indication that permission issues exist that prevent the action from executing on the artifact can be given, as shown by step 345. When permissions are sufficient, the action can be performed on the storage artifact, as shown by step 350. When other artifact exist in the collection, the next artifact can be handled, as shown by optionally progressing from step 355 to step 335. When no additional artifacts exist, further computing actions (including additional file management actions) can occur.

Figure 4:
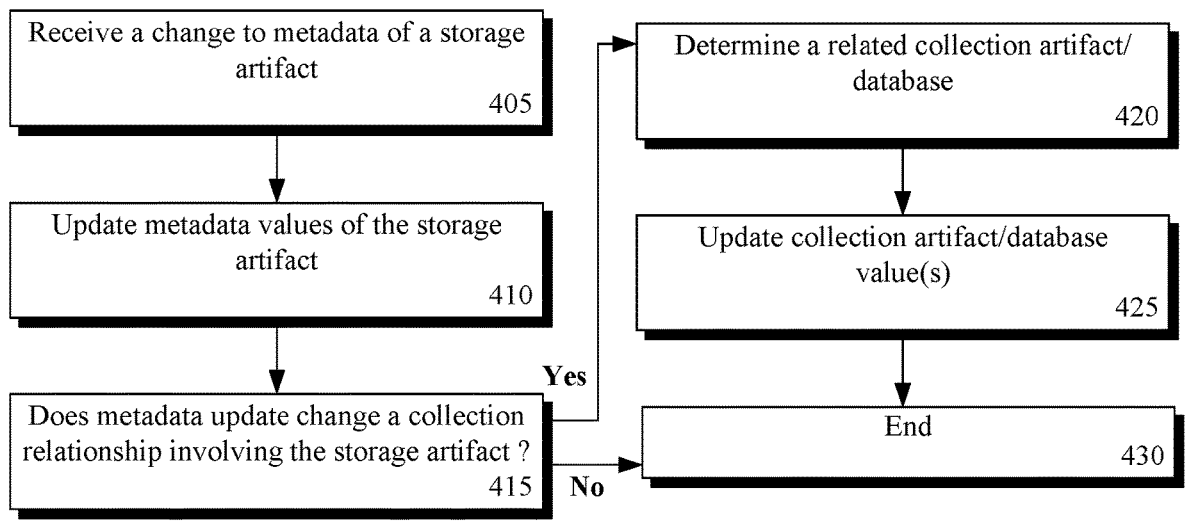
FIG. 4 shows a method for updating storage artifacts and collection metadata in accordance with an embodiment of the disclosure.

FIG. 4 shows a method 400 for updating storage artifact and collection metadata in accordance with an embodiment of the disclosure. Method 400 can be performed in context of system 100.

Method 400 can begin in step 405, where a request to change storage artifact metadata can be received. In step 410, metadata values of the storage artifact can be updated. In step 415, a determination can be made as to whether the update results in a change to a collection relationship. If not, the method ends in step 430. If so, a determination of related collection artifact and/or a collection database entry can be made, as shown by step 420. In step 425, the collection artifact values and/or collection database records can be updated to correspond to the update of step 410. Once the update occurred, the method can end, as shown by step 430.

Figure 5:
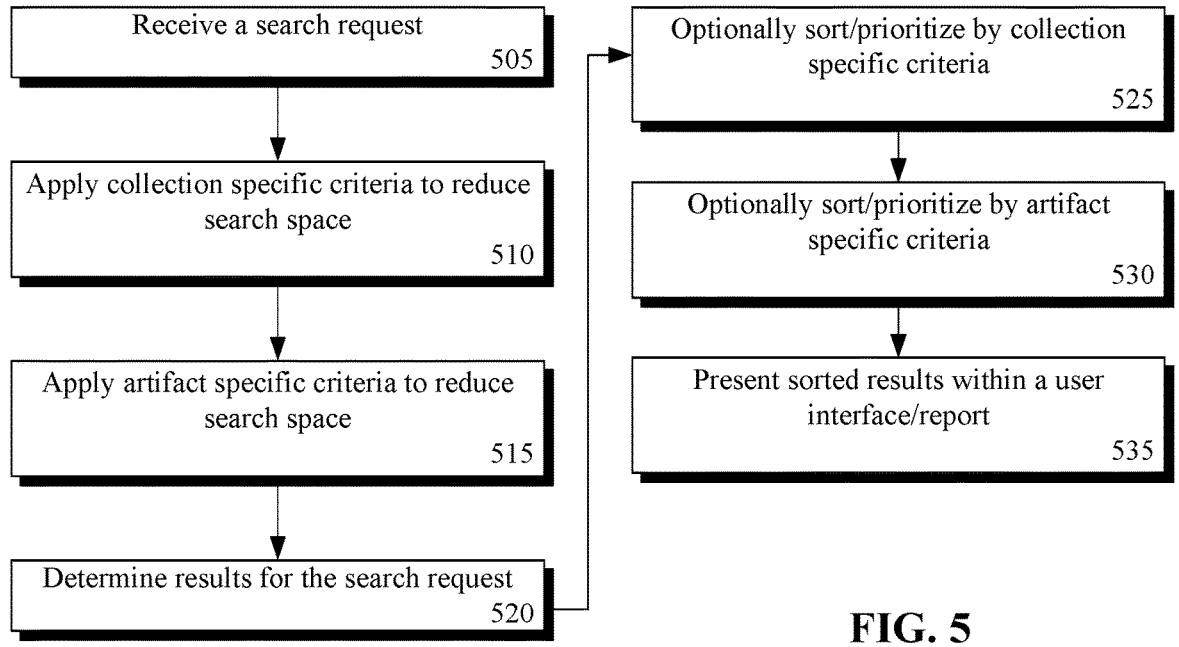
FIG. 5 shows a method for performing a search using storage artifact and/or collection criteria in accordance with an embodiment of the disclosure.

FIG. 5 shows a method 500 for performing a search using storage artifact and/or collection criteria in accordance with an embodiment of the disclosure. Method 500 can be performed in context of system 100.

Method 500 can begin in step 505, where a search request can be received. In step 510, collection specific criteria (if any) can be applied to a search space, to reduce the search space by the collection specific criteria. In step 515, artifact specific criteria (if any) can be applied to further reduce the search space. In step 520, results for the search request can be determined, which includes the storage artifacts that remain in the reduced storage space. In step 525, the results can be optionally sorted/prioritized by collection specific criteria. In step 530, the results can be optionally shorted/prioritized by artifact specific criteria. Steps 525 and 530 can be performed in reverse order in one embodiment. In step 535, the results can be presented within a user interface, report, and/or a file log.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for implementing a search within a tree structured repository having a plurality of nodes, comprising:
    receiving a search request including collection specific criteria and artifact specific criteria;
    reducing a search space for the search request using the collection specific criteria;
    reducing the search space for the search request using the artifact specific criteria;
    sorting results using one of the collection specific criteria or the artifact specific criteria; and
    presenting the sorted results, wherein
    the search space includes a plurality of storage artifacts stored in the plurality of nodes, and
    at least one of the storage artifacts includes metadata indicating that the one artifact is associated with a first collection of related heterogeneous artifacts and a second collection of related heterogeneous artifacts.
2. The method of claim 1, wherein
    the results are sorted using the artifact specific criteria.

3. The method of claim 1, wherein
the results are sorted using the collection specific criteria.

4. The method of claim 1, wherein
the results are sorted using both the artifact specific criteria and the collection specific criteria.

5. The method of claim 1, wherein
the metadata includes a first collection ID of the first collection a second collection ID of the second collection.

6. The method of claim 1, wherein
the results are from a search performed, responsive to the search request, on the tree structured repository,
the tree structured repository includes a plurality of collections each of which includes a plurality of storage artifacts, and
each of the plurality of collections are user-defined using metadata respectively associated with each of the plurality of storage artifacts.

7. A computer hardware system configured to implement a search within a tree structured repository having a plurality of nodes, comprising:
a computer hardware processor configured to initiate the following operations:
receiving a search request including collection specific criteria and artifact specific criteria;
reducing a search space for the search request using the collection specific criteria;
reducing the search space for the search request using the artifact specific criteria;
sorting results using one of the collection specific criteria or the artifact specific criteria; and
presenting the sorted results, wherein
the search space includes a plurality of storage artifacts stored in the plurality of nodes, and
at least one of the storage artifacts includes metadata indicating that the one artifact is associated with a first collection of related heterogeneous artifacts and a second collection of related heterogeneous artifacts.

8. The system of claim 7, wherein
the results are sorted using the artifact specific criteria.

9. The system of claim 7, wherein
the results are sorted using the collection specific criteria.

10. The system of claim 7, wherein
the results are sorted using both the artifact specific criteria and the collection specific criteria.

11. The system of claim 7, wherein
the metadata includes a first collection ID of the first collection a second collection ID of the second collection.

12. The system of claim 7, wherein
the results are from a search performed, responsive to the search request, on the tree structured repository,
the tree structured repository includes a plurality of collections each of which includes a plurality of storage artifacts, and
each of the plurality of collections are user-defined using metadata respectively associated with each of the plurality of storage artifacts.

13. A computer program product, comprising:
a computer hardware storage device having stored therein computer-usable program code for implementing a search within a tree structured repository having a plurality of nodes,
the computer-usable program code, which when executed by a computer hardware system, causes the computer hardware system to perform:
receiving a search request including collection specific criteria and artifact specific criteria;
reducing a search space for the search request using the collection specific criteria;
reducing the search space for the search request using the artifact specific criteria;
sorting results using one of the collection specific criteria or the artifact specific criteria; and
presenting the sorted results, wherein
the search space includes a plurality of storage artifacts stored in the plurality of nodes, and
at least one of the storage artifacts includes metadata indicating that the one artifact is associated with a first collection of related heterogeneous artifacts and a second collection of related heterogeneous artifacts.

14. The computer program product of claim 13, wherein
the results are sorted using the artifact specific criteria.

15. The computer program product of claim 13, wherein
the results are sorted using the collection specific criteria.

16. The computer program product of claim 13, wherein
the results are sorted using both the artifact specific criteria and the collection specific criteria.

17. The computer program product of claim 13, wherein
the metadata includes a first collection ID of the first collection a second collection ID of the second collection.

18. The computer program product of claim 13, wherein
the results are from a search performed, responsive to the search request, on the tree structured repository,
the tree structured repository includes a plurality of collections each of which includes a plurality of storage artifacts, and
each of the plurality of collections are user-defined using metadata respectively associated with each of the plurality of storage artifacts.

* * * * *